Dec. 15, 1925.

F. B. LOMAX 1,565,661

FILTER

Filed Sept. 29, 1924  2 Sheets-Sheet 1

Witnesses:
W. F. Kilroy
Harry R. L. White

Inventor:
Frank B. Lomax
Brown Bottcher Stenner
By  Attys

Dec. 15, 1925.

F. B. LOMAX

FILTER

Filed Sept. 29, 1924

Inventor:
Frank B. Lomax

Patented Dec. 15, 1925.

1,565,661

UNITED STATES PATENT OFFICE.

FRANK B. LOMAX, OF CHICAGO, ILLINOIS.

FILTER.

Application filed September 29, 1924. Serial No. 740,432.

*To all whom it may concern:*

Be it known that I, FRANK B. LOMAX, a citizen of the United States, residing at Chicago, in the county of Cook and State of Illinois, have invented a certain new and useful Improvement in Filters, of which the following is a full, clear, concise, and exact description, reference being had to the accompanying drawings, forming a part of this specification.

My invention has reference to filters or syrup makers, and more particularly to a device which is employed in the making syrup such as used in connection with the preparation of soft drinks and similar preparations, and combines in a syrup maker, a mixer and a filter of novel construction whereby the dissolving action on the sugar or solution of the ingredients occurring in solid form in water or other liquids is facilitated.

Heretofore, in making syrup, and particularly for preparing soft drinks or similar preparations for soda fountains and analogous uses, much time and effort has been consumed in effecting the solution of ingredients occurring in solid form, such as sugar in water, and to dissolve the same or other solid substances in water or other liquids expeditiously and economically, and still remove impurities which will leave the syrup clean and pure, as well as bright and removed of the impurities and dirt occurring in sugar ordinarily used, the "filtering," not "straining," of these impurities from the syrup, preventing fermentation, ropiness, cloudiness and precipitation.

The present machine is designed to cheapen the cost of producing syrup and carrying out the process expeditiously, and it embodies a tank or container so constructed that it may be made in one piece and overcomes the difficulties heretofore experienced in securing a diaphragm or filtering medium therein in the form of a partition, together with a novel arrangement of parts including a stand upon which the container is supported and secured.

A further object of the invention is to provide an agitator and a novel mounting therefor in conjunction with the container, together with a pump and driving means adapted to be easily controlled to operate either the agitator or stirring means and the pump for circulating a mass of solvent through a mass of solute, such as the sugar or other solid matter to the dissolved, and at other times withdrawing the material or syrup after being filtered and returning it to the tank or discharging the same, as desired.

With the above and other objects in view, the invention consists of certain novel combinations and arrangements of parts to be hereinafter more particularly described and claimed.

Figure 1:
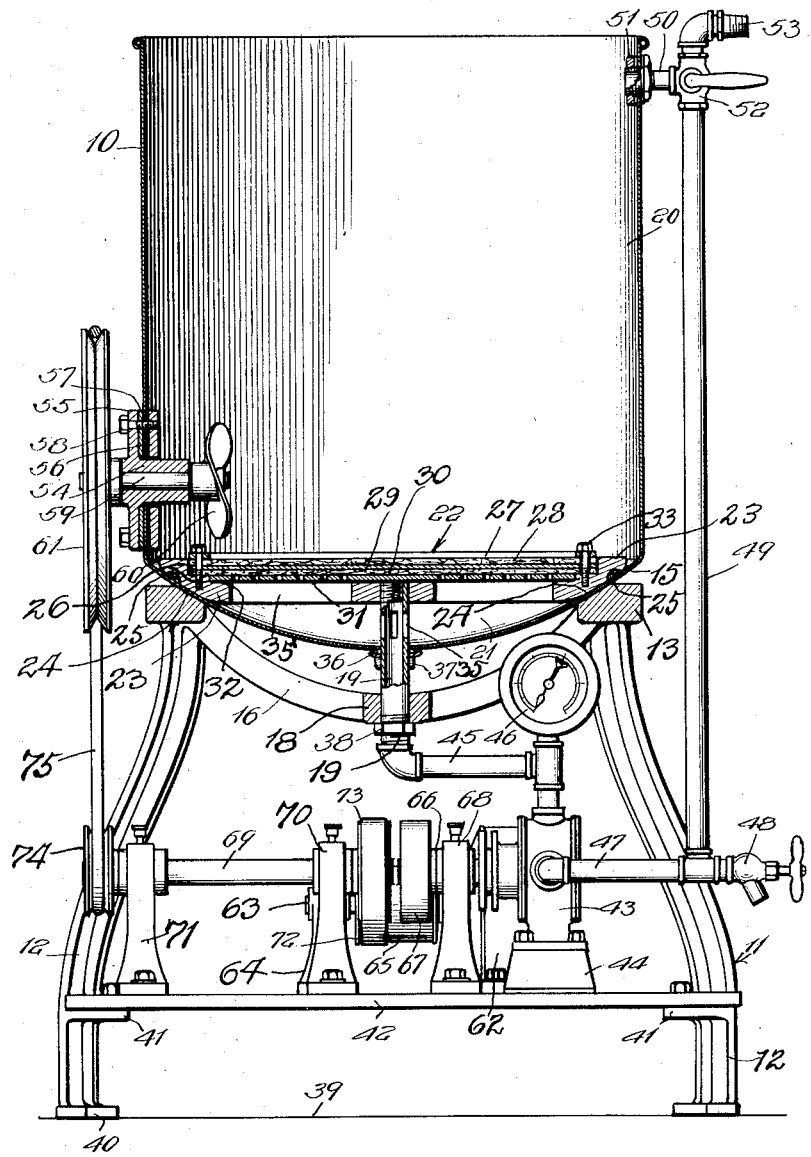
Fig. 1 is a central vertical sectional view partly in elevation of my improved filter or syrup maker.

Referring to the drawings in detail, in which like reference characters designate corresponding parts throughout the several views, 10 designates a container or tank open at the top and supported in such elevation as to permit ready access thereto for dumping the bags of sugar into the tank after being picked up off of the floor, being preferably about four feet from the floor so as to save the operator's time and obviate the necessity of hauling or carrying sugar to a platform several feet above the floor for discharging the same into the container. For this purpose, the container is supported upon a stand 11 having a plurality, preferably three legs 12 made in the form of a casting with a circular ring or top portion 13 preferably beveled at the inside, as indicated at 14, to take the convexly depressed bottom wall 15 of the tank and provided with spiders 16 curving downwardly in spaced relation to the bottom 15, as indicated at 17, formed with an axial opening at its hub 18 through which a discharge pipe 19 extends.

Figure 2:
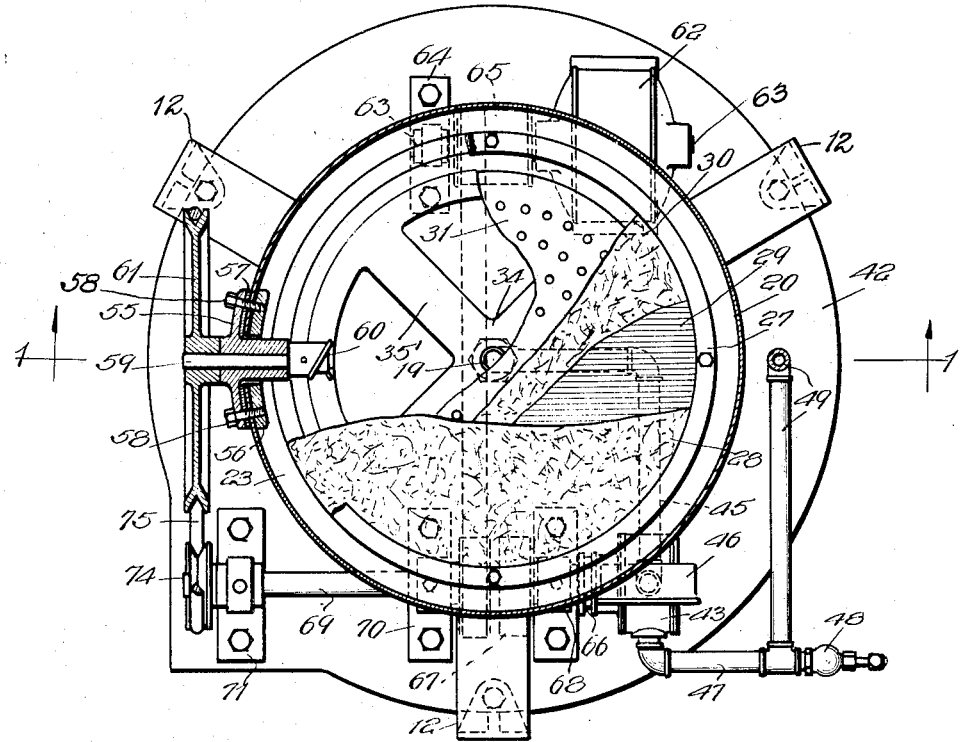
Fig. 2 is a plan view thereof partly broken away and in section.
Figure 3:
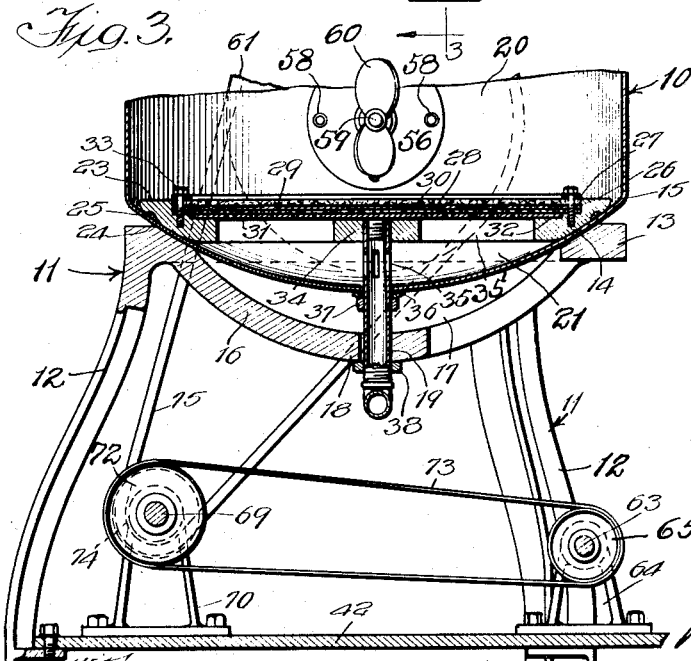
Fig. 3 is a fragmentary vertical sectional view taken at right angles to Fig. 1.

The container 10 is divided into an upper compartment 20 and a lower compartment 21 through the medium of a diaphragm, partition or filtering element 22 preferably consisting of an annular frame or ring 23 beveled at its outer corner, as indicated at 24, which beveled portion is provvided with a suitable packing 25 adapted to form a liquid-tight joint in connection with the bottom wall or convex bottom 15 of the tank or container, which it fits. The ring 23 is provided with a stepped upper face forming shoulders 26 adapted to take the filtering element, which consists of an upper ring or retaining member 27, a filtering medium, such as felt or the like, 28 in the form of a disc positioned therebeneath, another filtering element 29 between the filtering element 28 and a filtering element 30 corresponding to the filtering element 28. All of these elements are of the same diameter and seated snugly in the upper recess of the filtering ring 23 and supported upon a foraminous or perforated plate 31, preferably of metal, seated in a recess 32 within four cap screws 33 which are provided to hold the filtering elements in position on the ring 23 to form a partition subdividing the tank into an upper compartment 20 and a lower compartment 21, as previously described. It should also be noted that the container 10 seats in the frame 13 at the top of the stand so that the latter is practically formed with a seat or recess in which the container is retained as through the medium of the outlet pipe 19 which is threaded in a central part or nut 34 of the ring 23 or hub portion thereof, as more particularly seen in Figs. 2 and 3 of the drawings, formed at the inner ends of the spokes 35' and provided with a threaded axial or central aperture for engaging with the upper threaded end of the pipe 19 plugged in the manner shown. By this means, the container or tank 10 is firmly secured on the stand 11 and both parts may be very economically and satisfactorily produced in such a manner as to eliminate the necessity of mounting a horizontal partition transversely within the container, which operation is not only impractical, but very costly. Moreover, the present construction is such as to eliminate the possibility of the parts prematurely getting into a state of disrepair, and permits the tank to be made of porcelain, glass lined with enamel on the outside for cleanliness and sanitation.

It may also be mentioned that the screws 33 are passed through the retaining ring 27 and engaged in threaded apertures in the ring or frame 23, together with the filtering elements 28, 29 and 30. The elements 28 and 30 are preferably of wool felt made in the form of a filter pad, while the element 29 is preferably of filter paper and some non-rusting metal, such as Monel metal, is used for the filter disc or perforated plate 31. This permits the passage of the liquid or solvent while serving to retain the undissolved or solid particles of the mass of solute in the compartment 20 until dissolved and properly filtered into the compartment 21 thereneath. In this connection, it should be noted that both compartments are formed within an integral container structure while the discharge or outlet pipe 19 extends through an opening in the bottom 15 at its center and has openings preferably in the form of vertically elongated slots 35 through which the dissolved material or solution is drawn after passing into the lower compartment 21. A liquid tight joint is formed around the pipe 19 at the opening in the bottom 15 of the container as through the medium of a packing 36 and a retaining member or nut 37 mounted on the outlet or discharge pipe. The pipe then extends down through the hub portion 18 and receives a nut 38 thereon for cooperation with the threaded connection 34 to securely hold the container in assembled position on the stand 11.

The whole may be mounted upon a suitable base 39, although the legs 12 are provided with feet 40 for securing the same to a suitable support or flooring. The legs 12 may be provided with horizontally projecting ears 41 in spaced relation to the flooring or base to take a platform or shelf 42 constituting a support for certain of the operative mechanism of the device. As shown, a pump 43, preferably of the rotary type, is mounted upon a base 44 secured upon the shelf 42 and having an inlet connection 45 leading to the outlet or discharge pipe 19 of the container, while being further provided with a gauge 46, if desired. The outlet of the pump is indicated at 47 and is provided with a drain or flush valve or faucet 48 so that the fluid or syrup may be drawn off or forced upwardly through a return pipe 49 and into the container through the branch 50 extending through an opening in the adjacent portion of the container near the top thereof and secured in position, as indicated at 51, by suitable clamping nuts and washers. A valve 52 is provided in the connection between the pipe 49 and the branch 50 extending horizontally through the opening near the top of the container and has an outwardly horizontally extended connection 53 for drawing off the fluid at this point or discharging the same into containers for storage or shipment.

Immediately above the filter 22 at one side of the container 10, a bearing sleeve 54 is mounted to extend through an opening in the container wall and into the upper compartment 20. This bearing sleeve has a flange 55 at the outside formed integral therewith, and a collar 56 is fitted on the bearing 54 at the inside and through the medium of interposed packing 57 and securing means 58, such as screws, connecting the two parts; namely, the flange and collar, a liquid-tight joint is provided around the opening through which the bearing 54 extends. A shaft 59 is journaled in the bearing 54 and carries a screw propeller or other agitator 60 on its inner end and a grooved pulley or drive wheel 61 on its outer end, so that when the propeller is set in motion a violent circulation is set up in the entire mass within the compartment 20, including the solid material or solute to be dissolved and the solvent, such as the sugar and water which forms the syrup, respectively.

In order to drive the pump 43, a motor such as an electric motor 62 is mounted upon the shelf or base 42, and its shaft 63 is journaled in a bearing 64 and carries a wide pulley or drive wheel 65. The shaft of the suction pump 43 is designated at 66 and carries a fixed pulley 67 of approximately one-half the width of the pulley 65. The shaft 66 is mounted for rotation or journaled in a bearing 68. A shaft 69 is journaled in bearings 70 and 71 in alignment with the shaft 66 of the suction pump upon the shelf 42 and carries a pulley 72 at its inner end in spaced relation to the pulley 67 so as to adapt either to be engaged by a shiftable belt or endless drive member 73 trained on the pulley 65 and adapted to be shifted to drive either the suction pump 43 or the shaft 69 from the motor, prime mover or driving means 62. The shaft 69 extends at one side and has a grooved pulley 74 fixed thereto and of considerably smaller diameter than the upper pulley 61 fixed to the shaft of the agitator or propeller 60, around which an endless drive member or belt 75 is trained whereby the shaft 59 and propeller 60 may be driven from the motor through the medium of the belt 73 and shaft 69. In this way, the suction pump 43 and the propeller 60 may be independently operated to draw off the material from the compartment 21 after having been filtered by being drawn through the filter 22 or the entire mass in the compartment 20 agitated to set up a violent circulation and assist in dissolving the solid material therein. If desired, a valve may be interposed in the pipe connection 45 to control the quantity of material drawn off from the bottom compartment or to shut off the same as when operating the agitator 60.

In the operation of the device, it will be apparent from the foregoing that a mass of sugar or other substance to be dissolved is placed in the bottom of the compartment 20 of the container 10 upon the filter 22 and covered with a sufficient quantity of water or other liquid for properly dissolving the same. Actuation of the propeller or agitator 60 is effected by disposing the shiftable belt 73 upon the pulley 72 and driving the same from the motor 62 thus setting the entire mass in violent circulation to assist in dissolving the solid material. By shifting the belt 73 to the pulley 67, the suction pump 43 may be driven to continuously withdraw the liquid from below the filter or diaphragm 22; that is, from the compartment 21 through the openings 35 and pipe 45, to be discharged at the faucet or valve 48 into suitable containers or at the outlet connection 53, according to the position of the three-way valve 52 as controlled by its handle, or by so positioning the valve 52, this liquid may be reintroduced into the container 10 through the inlet connection 50. Part of the dissolved material of the mass or liquid part thereof will pass through the filter 22 or be sucked through the mass of solid substance and the diaphragm would be much more nearly saturated than the liquid above the diaphragm or filter, and the continued operation of the pump in conjunction with the agitator would eventually completely dissolve all of the material the the body of liquid was capable of dissolving. In this manner, both agitation and circulation, with suction, are employed to quickly and economically dissolve the sugar in the water or other solid material in the liquid. By introducing a predetermined level of the solvent liquid in the container 10, and a predetermined quantity of the mass of solid material, a given volume of clear filtered syrup may be produced from the same and all dirt and extraneous matter removed and held by the filter. By removing the fastening means or screws 33, the filter part may be removed and washed or cleaned, or the parts readily disassembled by disconnecting the ring 23 from the threaded upper end of the outlet pipe 19. By raising the openings 35 in spaced relation to the bottom 15 of the tank or container 10, any solid particles which might possibly pass through into the lower compartment 21 will be retained, but it is understood that the openings may be arranged close to the bottom as there is little likelihood of the solid matter passing through the filter. In any event, the thorough agitation of the mass and the suction action of drawing the same from the upper compartment 20 into the lower compartment 21 through the filter 22 for discharge or return to the container for refiltration, as desired, will produce a high grade syrup or uniform product expeditiously and economically. This method also eliminates a great time expenditure of pumping the syrup from a mixing tank to another tank for filtration, as carried on in connection with old methods. In addition, the top of the container is of such height as to permit the bags of sugar or other solid material to be dissolved to be picked off of the floor and immediately dumped into the tank, thereby saving the operator's time and obviating the necessity of hauling or carrying the material to a platform several feet above the floor, as heretofore done. The device also provides economy in floor space used and in general lends to efficiency and the production of a superior product at minimum cost, which product, being removed of impurities, will prevent fermentation, ropiness, cloudiness and precipitation.

It is obvious that the agitation and circulation of drawing off of the liquid may be simultaneously as well as independently carried on, and that other changes in the operation and in the construction and arrangement of the parts may be resorted to so long as the same does not depart from the spirit and scope of the invention as defined in the claims.

I claim:

1. In combination, a container, a filtering partition dividing said container into two compartments horizontally, agitating means in one compartment and circulating means for withdrawing material from the second compartment and including an outlet extending through the bottom of the container and securing the filtering partition in position against the bottom of the container at the inside.

2. In combination, a container, a horizontal filtering partition separating said container near the bottom into two superposed compartments, means for agitating the material in the upper compartment, means for withdrawing material from the lower compartment, a stand for supporting the container and a connection between the stand and the bottom of the container for securing the latter in position on the stand, said means comprising an outlet through which the material is withdrawn and having openings leading into the lower compartment.

3. In a filter, the combination with a supporting stand and a container having a bottom opening, a filtering partition mounted in the container upon the bottom and dividing the container into upper and lower compartments, an outlet extending through the bottom and connected to the filtering partition to secure the latter in position, withdrawing means connected to said outlet and agitating means mounted at one side of the container above the filtering partition.

4. In a filter, the combination with a supporting stand and a container having a bottom opening, a filtering partition mounted in the container upon the bottom and dividing the container into upper and lower compartments, an outlet extending through the bottom and connected to the filtering partition to secure the latter in position, withdrawing means connected to said outlet, and valved connections with the withdrawing means to discharge the material withdrawn and to return the same into the container.

5. In a filter, the combination with a supporting stand and a container having a bottom opening, a filtering partition mounted in the container upon the bottom and dividing the container into upper and lower compartments, an outlet extending through the bottom and connected to the filtering partition to secure the latter in position, withdrawing means connected to said outlet and agitating means mounted at one side of the container above the filtering partition, and a motor adapted to be operatively connected to the withdrawing means and the agitating means.

6. In combination, a container, a stand for supporting the container, a filtering partition dividing said container into two compartments, a bearing extending through one side of the container, plates upon opposite sides of the container at the bearing and connected through the container with an interposed packing means, a shaft journaled in the bearing, an agitating propeller on the inner end of the shaft, and circulating means for withdrawing material from the second compartment and returning it to the first, said withdrawing means including a pipe extending through the bottom of the container and having drive means adapted to be operatively connected to the shaft.

7. In combination, a container having a depressed bottom with a central opening, a partition having a ring engaging the bottom of the container and provided with filtering elements spaced from the bottom of the container to form upper and lower compartments, an outlet pipe extending through the opening in the bottom of the container and connected to the ring, a suction pump having connection with said pipe and provided with an outlet adapted to discharge outwardly of as well as into the container, and a motor having drive connection with the suction pump.

8. In combination, a container having a depressed bottom with a central opening, a partition having a ring engaging the bottom of the container and provided with filtering elements spaced from the bottom of the container to form upper and lower compartments, an outlet pipe extending through the opening in the bottom of the container and connected to the ring, a suction pump having connection with said pipe and provided with an outlet adapted to discharge outwardly of or into the container, an agitating member mounted through one side of the container, drive connections therefor positioned at the outside of the container, and a motor adapted to be operatively connected to the drive connections of the agitator and the suction pump for driving them.

9. In a filter, a stand having a beveled top frame, a container having a downwardly convexed bottom seated in said frame, said stand having a depressed top part, a filter mounted in the container and engaging the wall thereof to divide the same into upper and lower compartments, and withdrawing means having a pipe connection between the frame of the filter and the top of the stand to secure the two-in assembled relation and the container on the stand, and for emptying the material from the lower compartment.

10. In a filter, a stand, a container mounted on the stand, an agitator mounted through one side of the container, a partition mounted in the container and supported upon its bottom wall to divide the container into a relatively large upper compartment and a relatively shallow lower compartment, an outlet pipe leading from the lower compartment and constituting connecting means between the partition and the stand to draw the container against the stand, and drive means for the agitator.

11. In a filter, a stand, a container mounted on the stand, an agitator mounted through one side of the container, a partition mounted in the container and supported upon its bottom wall to divide the container into a relatively large upper compartment and a relatively shallow lower compartment, an outlet pipe leading from the lower compartment and constituting connecting means between the partition and the stand to draw the container against the stand, a suction pump connected to said outlet and having a discharge pipe with upper and lower connections adapted to empty the material withdrawn, as well as to discharge the same into the container, and a motor having shiftable drive connections for operating the suction pump and agitator.

12. In a filter, a stand, a shelf supported in an elevated position near the bottom of the stand, a container mounted on the stand, an agitator mounted through one side of the container, a partition mounted in the container and supported upon its bottom wall to divide the container into a relatively large upper compartment and a relatvely shallow lower compartment, connecting means between the partition and the stand to secure the partition in position in the container in liquid-tight connection with the bottom thereof and the container against the stand, and withdrawing means arranged upon the shelf and extending into the lower compartment for withdrawing the material therefrom.

13. In a filter, a stand, a shelf supported in an elevated position near the bottom of the stand, a container mounted on the stand, an agitator mounted through one side of the container, a partition mounted in the container and supported upon its bottom wall to divide the container into a relatively large upper compartment and a relatively shallow lower compartment, said filter having a frame with a central portion and a packing engaging the bottom of the container, filtering elements secured upon the frame and having a foraminous bottom plate engaging the central portion, a connection between the container, stand and central portion of the filter frame to draw said parts together in binding relation, a suction pump mounted upon the shelf, a motor mounted upon the shelf and adapted to be suitably controlled, a pulley on the drive shaft of the motor, a pulley on the drive shaft of the pump, an outlet for the pump, and an inlet for the pump extending from the lower compartment, a shaft having operative connection with the agitator, a pulley on the last named shaft, and a belt on the first named pulley and adapted to be shifted to the pulleys of the suction pump and last named shaft for independently operating the suction pump and agitator.

14. In combination, a container having a depressed, convex bottom, a filter including a ring having a beveled portion disposed in water-tight connection with the bottom of the container near its lateral wall, means for holding said frame against the bottom, a filtering element detachably mounted within the frame, and withdrawing means extending into the container below the filter and having openings communicating with the container.

15. In combination, a container having a depressed bottom, a stand having a depressed top portion and a rim against which the bottom of the container rests, connecting means between the depressed bottom and the depressed top of the stand, a filter including a frame mounted in the container and having a stepped top face, a filtering medium mounted upon the frame and including a foraminous plate at the bottom thereof, securing means detachably securing the filtering elements to the frame and the plate in position, said filter dividing the container into a large upper compartment and a shallow lower compartment with its bottom wall sloping toward the center, and withdrawing means having an inlet pipe extending through the bottom and provided with an inlet opening in the lower compartment.

16. In combination, a support, a container mounted on the said support, a partition mounted in the said container and supported upon the bottom of the said container dividing the container into two compartments, an outlet pipe leading from the lower compartment and constituting connecting means between the partition and the support to draw the container against the said support, said partition including filtering means, and an agitator positioned in the said container.

17. In combination, a support, a container mounted on the said support, a partition including filtering means mounted in the container and supported upon the bottom of said container to divide the container into two compartments, an outlet pipe leading from the lower compartment and constituting connecting means between the partition and the support to draw the container against the support, suction means connected to said outlet and having a discharge pipe with upper and lower connections adapted to empty the material withdrawn, an agitator in the said container, and driving means having shiftable drive connections for operating the suction means and agitator.

18. In combination, a container in which material to be dissolved is placed, a supporting structure upon which the said container is disposed, a filter partition within the said container and dividing it into two compartments, said filter partition being supported on the bottom of the said container, and a tubular element for securing the container in position upon the supporting structure and for maintaining the filter in position on top of the bottom of the container, said tubular element being equipped with means for withdrawing the material from the lower compartment of the container.

19. In combination, a container in which material to be dissolved is placed, a supporting structure upon which the said container is disposed, a filter partition within the said container and dividing it into two compartments, the said filter partition being supported on the bottom of the said container, agitating means disposed in said container above said partition for aiding in the dissolving of the material, and tubular means for securing the container in position upon the supporting structure and for maintaining the filter partition in position on top of the bottom of the container, said tubular means being equipped with means for withdrawing material from the lower compartent of the container.

In witness whereof, I hereunto subscribe my name this 26 day of Sept., 1924.

FRANK B. LOMAX.